United States Patent [19]

Capehart

[11] Patent Number: 5,784,814
[45] Date of Patent: Jul. 28, 1998

[54] CALENDAR DISPLAY

[75] Inventor: Richard M. Capehart, Richmond, Va.

[73] Assignee: Innovative Creations, Inc., Richmond, Va.

[21] Appl. No.: 605,844

[22] Filed: Feb. 26, 1996

[51] Int. Cl.⁶ .................................................. G09D 3/04
[52] U.S. Cl. ...................... 40/121; 40/107; 40/120; 40/594; 40/600; 283/2
[58] Field of Search .................... 40/107, 120, 121, 40/539, 594, 600, 610; 283/2; D19/21

[56] References Cited

U.S. PATENT DOCUMENTS

| Re. 22,839 | 2/1947 | Potter . | |
|---|---|---|---|
| 936,848 | 10/1909 | Avery | 40/107 X |
| 1,491,668 | 4/1924 | Brown . | |
| 1,594,499 | 8/1926 | Deaton . | |
| 1,594,563 | 8/1926 | Robinson | 283/2 |
| 1,687,138 | 10/1928 | Myers | 40/610 X |
| 2,128,989 | 9/1938 | Dickerson . | |
| 2,321,607 | 7/1943 | Lichter . | |
| 2,356,132 | 8/1944 | Trollen . | |
| 2,690,625 | 10/1954 | Dazey . | |
| 2,755,576 | 7/1956 | Golden | 40/121 X |
| 2,902,785 | 9/1959 | Nichols | 40/120 |
| 3,254,434 | 6/1966 | Gintoft | 40/610 X |
| 3,305,206 | 2/1967 | Nichols | 40/120 X |
| 3,322,093 | 5/1967 | Goland et al. | 40/610 X |
| 3,370,368 | 2/1968 | Paschal | 40/120 |
| 4,143,847 | 3/1979 | Cross | 40/120 X |
| 4,276,703 | 7/1981 | Brindley | 40/121 |
| 4,423,562 | 1/1984 | Nichols | 40/170 |
| 4,948,034 | 8/1990 | Rohloff | 283/2 X |
| 5,062,229 | 11/1991 | Werjefelt | 40/170 |
| 5,280,961 | 1/1994 | Rohloff | 283/2 |

FOREIGN PATENT DOCUMENTS

| 717355 | 10/1931 | France | 40/121 |
|---|---|---|---|
| 438380 | 2/1925 | Germany | 40/121 |
| 1193799 | 6/1970 | United Kingdom | 40/107 |
| 2086116 | 5/1982 | United Kingdom | 40/610 |
| 2231997 | 11/1990 | United Kingdom | 40/610 |

*Primary Examiner*—Brian K. Green
*Assistant Examiner*—Andrea Chop
*Attorney, Agent, or Firm*—Donald A. Kettlestrings

[57] ABSTRACT

A calendar display includes a flat support defining a plurality of scored lines of structural weakness. A plurality of stacked sheets bearing weekly and monthly time indicia are removably connected to a front surface of the support adjacent to a first, upper edge of the support. An adhesive strip is located adjacent to the first, upper edge on a back surface of the support. Manipulation of the support by bending the support in predetermined directions about the scored lines of structural weakness and contacting the adhesive strip with the back surface of the support adjacent to a second, lower edge of the support permits the support to be configured as a self-supporting stand for displaying the sheets on a horizontal surface. The support also can be severed along a predetermined one of the scored lines of structural weakness to provide a display of the sheets which can be attached to a vertical surface by means of the adhesive strip or by a magnet connected to the back surface of the support adjacent to the first, upper edge of the support.

15 Claims, 1 Drawing Sheet

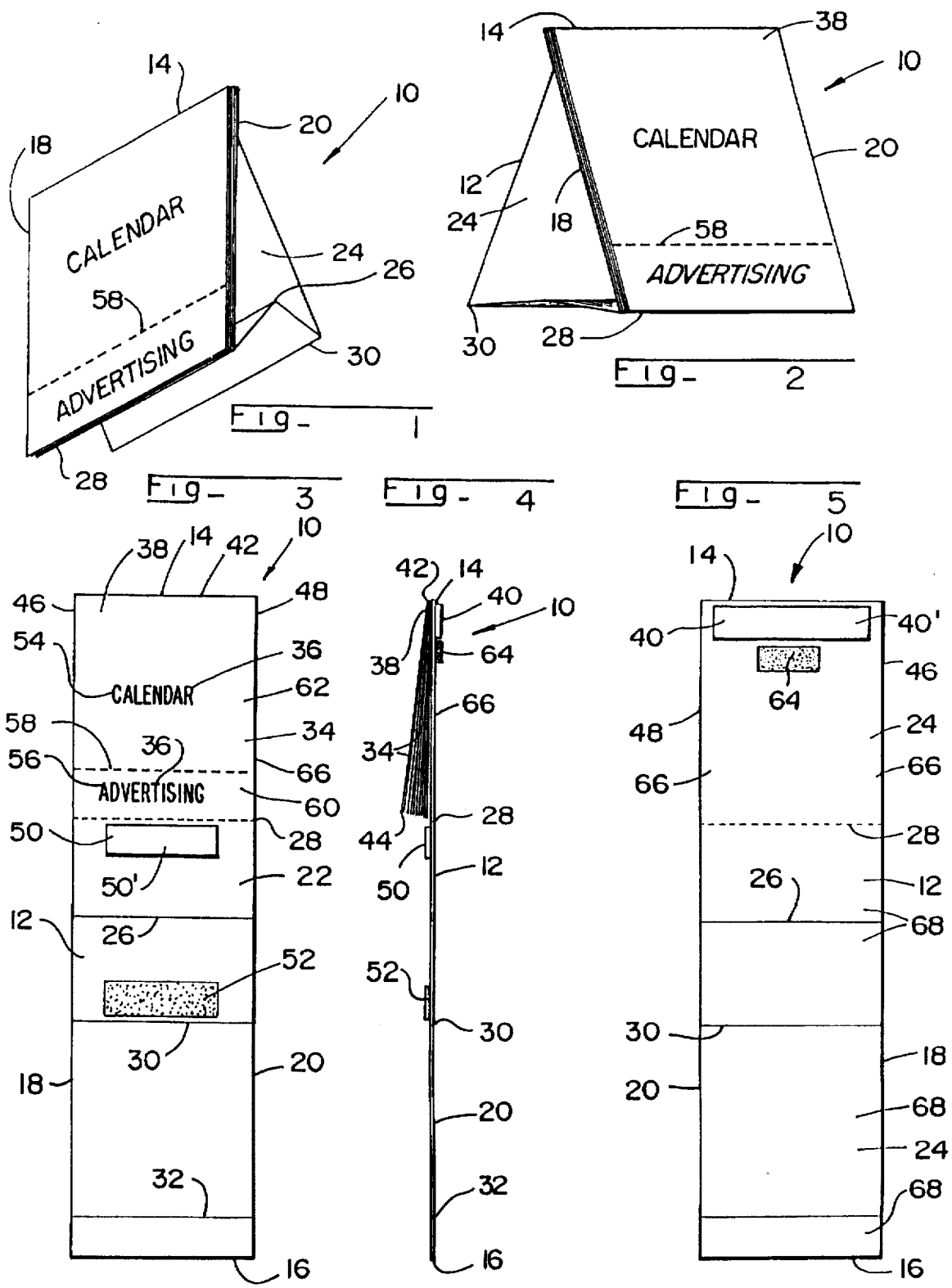

CALENDAR DISPLAY

BACKGROUND OF THE INVENTION

This invention relates to displays and more particularly to a calendar display which can be manipulated from a flat configuration to form a support stand for supporting a calendar on a horizontal surface. The display can also be manipulated to enable a portion of the calendar display to be attached to a vertical surface.

Calendars provide effective advertising devices and calendars are frequently mailed or otherwise shipped to customers. Storing, mailing or shipping typically requires that the calendar be in an essentially flat configuration to save space, but it is also desirable to provide a calendar which includes its own built-in stand for positioning on a horizontal surface.

It is, therefore, an object of the present invention to provide a calendar display.

Another object is to provide a calendar display which can be stored, mailed or shipped in a substantially flat configuration.

A further object of the invention is the provision of a calendar display which can be quickly and easily manipulated from a substantially flat configuration to form a stand for positioning and supporting the calendar on a horizontal surface.

Yet another object of the present invention is the provision of such a calendar display which can be quickly and easily modified to create a calendar display which can be mounted or attached to a vertical surface.

A still further object is to provide such a calendar display which can be firmly attached to metallic or non-metallic surfaces.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides a display comprising: a support defining first and second opposed edges and third and fourth opposed edges, and further defining opposed front and back surfaces; the support defining a first scored line of structural weakness for aiding bending located substantially midway between the first and second opposed edges; the support defining a second perforated line of structural weakness for aiding bending or severance located between the first scored line and the first edge; the support defining a third scored line of structural weakness for aiding bending located between the first scored line and the second edge; the support further defining a fourth scored line of structural weakness for aiding bending located between the third scored line and the second edge; a plurality of stacked sheets bearing indicia and defining upper margins removably connected at the margins to each other and to the front surface of the support adjacent to the first edge; and a first adhesive strip located adjacent to the first edge on the back surface of the support and between the first edge and the second perforated line.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

FIG. 1 is a perspective view of the display as positioned on a horizontal surface in a first configuration;

FIG. 2 is a perspective view of the display as positioned on a horizontal surface in a second configuration;

FIG. 3 is a front view showing the display in an unfolded configuration;

FIG. 4 is a rear view showing the display in an unfolded configuration; and

FIG. 5 is a side view showing the display in an unfolded configuration.

DESCRIPTION OF THE PREFERRED EMBODIMENT

With reference now to the drawings, wherein like reference characters designate like or corresponding parts throughout the several views, there is shown a display 10 which comprises a support 12 defining first and second opposed edges 14, 16 and third and fourth opposed edges 18, 20. Support 12 further defines opposed front and back surfaces 22, 24.

Support 12 defines a first scored line 26 of structural weakness for aiding bending located preferably midway between edges 14 and 16. Support 12 further defines a second perforated line 28 of structural weakness for aiding bending or severance located between first scored line 26 and first edge 14. In accordance with the invention, support 12 further defines a third scored line 30 of structural weakness for aiding bending located between first scored line 26 and second edge 16. Lines 28 and 30 are preferably located equidistant from scored line 26.

Support 12 also defines a fourth scored line 32 of structural weakness for aiding bending located between third scored line 30 and second edge 16.

A plurality of stacked sheets 34 bearing indicia 36 and defining upper margins 38 are removably connected at margins 38 to each other and to front surface 22 of support 12 adjacent to first edge 14. A first adhesive strip 40 is preferably located immediately adjacent to first edge 14 on back surface 24 of support 12 and between first edge 14 and second perforated line 28.

Each of sheets 34 defines first and second opposed edges 42, 44 and third and fourth opposed edges 46, 48 which are preferably positioned in alignment with first edge 14 of support 12, second perforated line 28, and third and fourth edges 18, 20 of support 12, respectively.

A second adhesive strip 50 is preferably located between lines 28 and 30 and is connected to front surface 22 of support 12. A first magnet 52 is also preferably located between lines 28 and 30 and is connected in a conventional manner, such as by adhesive, to front surface 22 of support 12.

Each of sheets 34 preferably bears first and second indicia 54, 56 and defines a fifth scored or perforated line 58 of structural weakness for severance which extends completely across each sheet 34 between indicia 54 and 56 for enabling removal of that portion 60 of sheet 34 which contains second indicia 56 from that portion 62 of sheet 34 which contains first indicia 54.

Adhesive strips 40, 50 each preferably includes a double-sided adhesive strip and a cover strip 40', 50', respectively, removably attached to the double-sided adhesive strip for protecting the double-sided adhesive strip when not in use.

In accordance with a preferred embodiment of the invention, first indicia 54 preferably include weekly and monthly time indicia, and second indicia 56 preferably include advertising information.

Scored or perforated line 58 and indicia 56 are located beneath time indicia 54 as indicia 54, 56 are normally viewed. Support 12 and each of sheets 34 are preferably rectangular in shape, and sheets 34 can be conventionally removably connected to each other and to support 12 at margins 38 by adhesive, stitching, staples or the like. Support 12 is preferably made from cardboard or a heavy weight paper, and sheets 34 are preferably comprised of paper.

In accordance with the invention, magnet 52 and adhesive strip 50 each projects away from front surface 22 of support 12 by an equal distance so that magnet 52 and adhesive strip 50 do not interfere with each other when display 10 is attached to a horizontal metal surface by magnet 52 or to a non-metallic or metal surface by adhesive strip 50.

Display 10 further preferably includes a second magnet 64 conventionally connected to back surface 24 of support 12 adjacent to adhesive strip 40. Magnet 64 and adhesive strip 40 preferably each projects away from back surface 24 of support 12 by an equal distance so that magnet 64 and adhesive strip 40 do not interfere with each other when portion 66 of display 10 between edge 14 and perforated line 28 is severed from the remainder of display 10 to be mounted on a vertical surface by magnet 64 or strip 40.

In use, display 10 can be manipulated and folded to reduce its overall length for convenience in storing, shipping or mailing. This can typically be accomplished by folding back support 12 about perforated line 28 and by simultaneously or thereafter folding forward support 12 about scored line 26. Display 10 could be further reduced in overall length by then folding support 12 back about scored line 30. Display 10 is essentially flat after these manipulations.

Manipulation of display 10 to form a stand from support 12 for displaying stacked sheets 34 on a horizontal surface begins with the step of unfolding support 12 from its previously described folded condition for storing, shipping or mailing. Support 12 is then folded forwardly about scored line 26. Support 12 is then or simultaneously folded backwardly about lines 28, 30. These folding steps result in an inverted V-shaped configuration being created by support 12 between lines 28, 30.

Support 12 is then folded rearwardly about lines 28 and 30, and edges 14, 16 are brought together in alignment with each other. Cover strip 40' is removed from adhesive strip 40 to expose an adhesive surface of strip 40, and back surface 24 of support 12 between scored line 32 and edge 16 is pressed against and adhered to adhesive strip 40. Simultaneously therewith, support 12 can be folded forwardly about scored line 32. This provides for a desirable rearward canting or sloping of sheets 34 when display 10 is positioned on a horizontal surface.

The display resulting from the aforedescribed manipulation rests on the edges created by the manipulation along lines 28 and 30, and this configuration is shown in FIG. 1 on a level surface.

An alternative manipulation of display 10 can be used to result in the display shown in FIG. 2. This is accomplished in the same manner previously described with respect to display 10 shown in FIG. 1 with the exception that support 12 is not folded about scored line 26. As a result, front surface 22 of support 12 between lines 28, 30 is positioned flat against the horizontal surface upon which display 10 is positioned. If display 10 in this configuration is positioned on a metal surface, magnet 52 will act to hold display 10 in position. If display 10 in this configuration is positioned onto a metallic or non-metallic surface, cover strip 50' can be removed from adhesive strip 50 to expose the adhesive surface of adhesive strip 50. The adhesive surface of strip 50 can then be pressed against the horizontal surface upon which the display is positioned to hold the display in position.

If it is desired to position display 10 on a vertical surface, support 12 can be torn or cut along perforated line 28 to separate that portion 66 of support 12 between line 28 and first edge 14 from the remaining portion 68 of support 12 between line 28 and edge 16. Sheets 34 are aligned with the edges of portion 66 of support 12 so that a neat appearance is created.

Separated portion 66 of support 12, together with sheets 34, can then be quickly and easily attached to a vertical surface by use of adhesive strip 40 or by use of magnet 64. If adhesive strip 40 is used, cover strip 40' is removed to expose an adhesive surface of strip 40. Portion 68 of support 12 can be discarded.

Although the locations of lines 26, 28, 30 and 32 on support 12 may be varied, it is preferred that line 26 be located midway between edges 14, 16. To create the preferred stability and appearance of display 10 when the display is positioned on a horizontal surface, it is preferred that line 28 be spaced apart from line 26 by a distance equal to between twenty-nine and thirty percent of the total distance between line 26 and edge 14. Similarly, it is preferred that the distance between line 30 and line 26 be from twenty-nine to thirty percent of the total distance between line 26 and edge 16. It is also preferred that line 32 be located a distance from line 26 equal to eighty-five percent of the total distance between line 26 and edge 16.

This invention provides for a calendar display which can be stored or shipped in a flat condition and which can be quickly and easily manipulated for displaying the calendar on a horizontal or vertical surface.

The invention in its broader aspects is not limited to the specific details shown and described, and departures may be made from such details without departing from the principles of the invention and without sacrificing its chief advantages.

What is claimed is:

1. A display comprising:
   a support defining first and second opposed edges and third and fourth opposed edges, and further defining opposed front and back surfaces;
   said support defining a first scored line of structural weakness for aiding bending located substantially midway between said first and second opposed edges;
   said support defining a second perforated line of structural weakness for aiding bending or severance located between said first scored line and said first edge;
   said support defining a third scored line of structural weakness for aiding bending located between said first scored line and said second edge;
   said support further defining a fourth scored line of structural weakness for aiding bending located between said third scored line and said second edge;
   a plurality of stacked sheets bearing indicia and defining upper margins removably connected at said margins to each other and to said front surface of said support adjacent to said first edge;

a first adhesive strip located adjacent to said first edge on said back surface and between said first edge and said second perforated line;

wherein said second and third lines are located substantially equidistant from said first scored line; and wherein each of said sheets defines first and second opposed edges and third and fourth opposed edges which are positioned in substantial alignment with said first edge of said support, said second perforated line, and said third and fourth edges of said support, respectively.

2. A display as in claim 1 further including a second adhesive strip located between said second and third lines and connected to said front surface of said support.

3. A display as in claim 2 further including a first magnet located between said second and third lines and connected to said front surface of said support.

4. A display as in claim 3 wherein each of said sheets bears first and second indicia and defines a fifth scored line of structural weakness for severance which extends completely across each said sheet between said first and second indicia for enabling removal of that portion of said sheet which contains said second indicia from that portion of said sheet which contains said first indicia.

5. A display as in claim 4 wherein said first and second adhesive strips each include a double-sided adhesive strip and a cover strip removably attached to said double-sided adhesive strip for protecting said double-sided adhesive strip when not in use.

6. A display as in claim 5 wherein said first indicia include weekly and monthly time indicia.

7. A display as in claim 6 wherein said second indicia include advertising information.

8. A display as in claim 7 wherein said first scored line of structural weakness for severance and said advertising information are located beneath said time indicia as said time indicia and said advertising information are viewed during use of said display.

9. A display as in claim 8 wherein said support and each of said sheets are rectangular in shape.

10. A display as in claim 9 wherein said sheets are removably connected to each other and to said support by adhesive.

11. A display as in claim 10 wherein said first magnet and said second adhesive strip each projects away from said front surface of said support by a substantially equal distance, whereby said first magnet and said second adhesive strip do not interfere with each other when said display is attached to a metal surface by said first magnet or to a non-metallic or metal surface by said second adhesive strip.

12. A display as in claim 3 further including a second magnet connected to said back surface of said support adjacent to said first adhesive strip.

13. A display as in claim 12 wherein said second magnet and said first adhesive strip each projects away from said back surface of said support by a substantially equal distance.

14. A display as in claim 1 wherein said second and third lines are each located a distance from said first line equal to twenty-nine to thirty percent of the distance between said first line and said first and second edges, respectively.

15. A display as in claim 14 wherein said fourth line is located a distance from said first line equal to eighty-five percent of the distance between said first line and said second edge.

* * * * *